United States Patent
Junqua et al.

(10) Patent No.: US 6,314,165 B1
(45) Date of Patent: Nov. 6, 2001

(54) AUTOMATED HOTEL ATTENDANT USING SPEECH RECOGNITION

(75) Inventors: Jean-Claude Junqua; Matteo Contolini, both of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/070,399

(22) Filed: Apr. 30, 1998

(51) Int. Cl.[7] ................................................. H04M 1/64
(52) U.S. Cl. .......................... 379/88.03; 379/216.01; 704/258; 704/266
(58) Field of Search ............................. 379/88.01, 88.03, 379/88.04, 88.07, 88.08, 88.16, 201, 352, 353, 201.01, 216.01, 355.01; 704/231, 251, 254, 257, 10, 243, 255, 258–260, 266, 267, 270

(56) References Cited

U.S. PATENT DOCUMENTS

| | | |
|---|---|---|
| 5,212,730 | 5/1993 | Wheatley et al. . |
| 5,752,230 | 5/1998 | Alonso-Cedo . |
| 5,930,336 * | 7/1999 | Junqua et al. .................... 379/88.03 |
| 6,016,471 * | 1/2000 | Kuhn et al. ........................... 704/266 |
| 6,029,132 * | 2/2000 | Kuhn et al. ........................... 704/260 |
| 6,049,594 * | 4/2000 | Furman et al. ...................... 379/67.1 |
| 6,092,044 * | 7/2000 | Baker et al. .......................... 704/254 |
| 6,230,131 * | 5/2001 | Kuhn et al. ........................... 704/266 |
| 6,233,553 * | 5/2001 | Contolini et al. .................... 704/220 |

FOREIGN PATENT DOCUMENTS

| | | |
|---|---|---|
| WO 99/26232 | 5/1999 | (DE) . |
| 0 562 138 A1 | 9/1993 | (EP) . |
| 0 568 979 A1 | 11/1993 | (EP) . |

OTHER PUBLICATIONS

Asadi, Schwartz & Makhoul "Automatic Modeling for Adding New Words to a Large–Vocabulary Continuous Speech Recognition System" 1991 IEEE Publications pp. 305–308.

* cited by examiner

Primary Examiner—Fan Tsang
Assistant Examiner—Roland G. Foster
(74) Attorney, Agent, or Firm—Harness, Dickey & Pierce, P.L.C.

(57) ABSTRACT

An automated hotel attendant is provided for coordinating room-to-room calling over a telephone switching system that supports multiple telephone extensions. A hotel registration system receives and stores the spelled names of hotel guests as well as assigns each guest an associated telephone extension. A lexicon training system is connected to the hotel registration system for generating pronunciations for each spelled name by converting the characters that spell those names into word-phoneme data. This word-phoneme data is in turn stored in a lexicon that is used by a speech recognition system. In particular, a phoneticizer in conjunction with a Hidden Markov Model (HMM) based model trainer serves as the basis for the lexicon training system, such that one or several HMM models associated with each guest name are stored in the lexicon. An automated attendant is coupled to the speech recognition system for converting a spoken name of a hotel guest entered from one of the telephone extensions into a predefined hotel guest name that can be used to retrieve an assigned telephone extension from the hotel registration system. Next, the automated attendant causes the telephone switching system to call the requested telephone extension in response to the entry of the spoken name from one of the telephone extensions.

12 Claims, 4 Drawing Sheets

AUTOMATED HOTEL ATTENDANT USING SPEECH RECOGNITION

BACKGROUND AND SUMMARY OF THE INVENTION

The present invention relates generally to an automated hotel attendant system, and more particularly to an automated hotel attendant system that utilizes a lexicon training system to automatically train a speech recognizer as well as to maintain a hotel guest database.

Automatic attendants are commonly being implemented in office type environments. Typically, these automatic attendants are using phonetic-based recognizers to perform call routing functions in conjunction with a private branch exchange (PBX).

In speech recognition applications, phonetic transcriptions for each word in the dictionary are needed to build the models for the speech recognizer prior to use. Traditionally, phonetic transcriptions are manually created by lexicographers who are skilled in the nuances of phonetic pronunciation of the particular language of interest. Developing a good phonetic transcription for each word in the dictionary is time consuming and requires a great deal of skill. Moreover, a dictionary for use in an automatic attendant would not generally be complete with respect to surnames. Although phonetic transcriptions for each surname could possible be generated for each person in the relatively static office type environment, this approach is not feasible for implementing an automated attendant in a constantly changing application, such as the surnames in a hotel guest database.

Much of the labor and specialized expertise for generating phonetic transcriptions can be dispensed with by using a lexicon training system to automatically build the models for the speech recognizer of an automated attendant. The lexicon training system of the present invention extends current recognition systems to recognize words, such as surname and geographic locations, that are not currently found in existing dictionaries. A robust and reliable phoneticizer for generating multiple pronunciations from the written form of a name is one important aspect of this lexicon training system. Once the pronunciation of a surname is known, it is then possible to build a speaker-independent speech recognition model that can be used to automatically train and/or update a speech recognizer for use in an automated attendant.

Accordingly, the automated attendant of the present invention incorporates the above-described principles and is ideally suited for incorporation with hotel registration and telephone systems. The automated hotel attendant provides call routing functions along with other additional services to hotel guests without the need to be connected to a hotel operator. A hotel registration system receives and stores the spelled names of hotel guests as well as assigns each guest an associated telephone extension. A lexicon training system is connected to the hotel registration system for generating pronunciations for each spelled name by converting the characters that spell those names into word-phoneme data. This word-phoneme data is in turn stored in a lexicon that is used by a speech recognition system. An automated attendant is coupled to the speech recognition system for converting a spoken name of a hotel guest entered from one of the telephone extensions into a predefined hotel guest name that can be used to retrieve an assigned telephone extension from the hotel registration system. Next, the automated attendant causes the telephone switching system to call the requested telephone extension in response to the entry of the spoken name from one of the telephone extensions.

DETAILED DESCRIPTION OF THE PREFERRED EMBODIMENT

The following description of the present invention is merely exemplary in nature and is in no way intended to limit the invention or its uses. Moreover, the following description, while depicting an automated hotel attendant system using a lexicon training system to automatically train a speech recognizer, is intended to adequately teach one skilled in the art to make and use an automated attendant system for a variety of speech processing applications.

Figure 1:
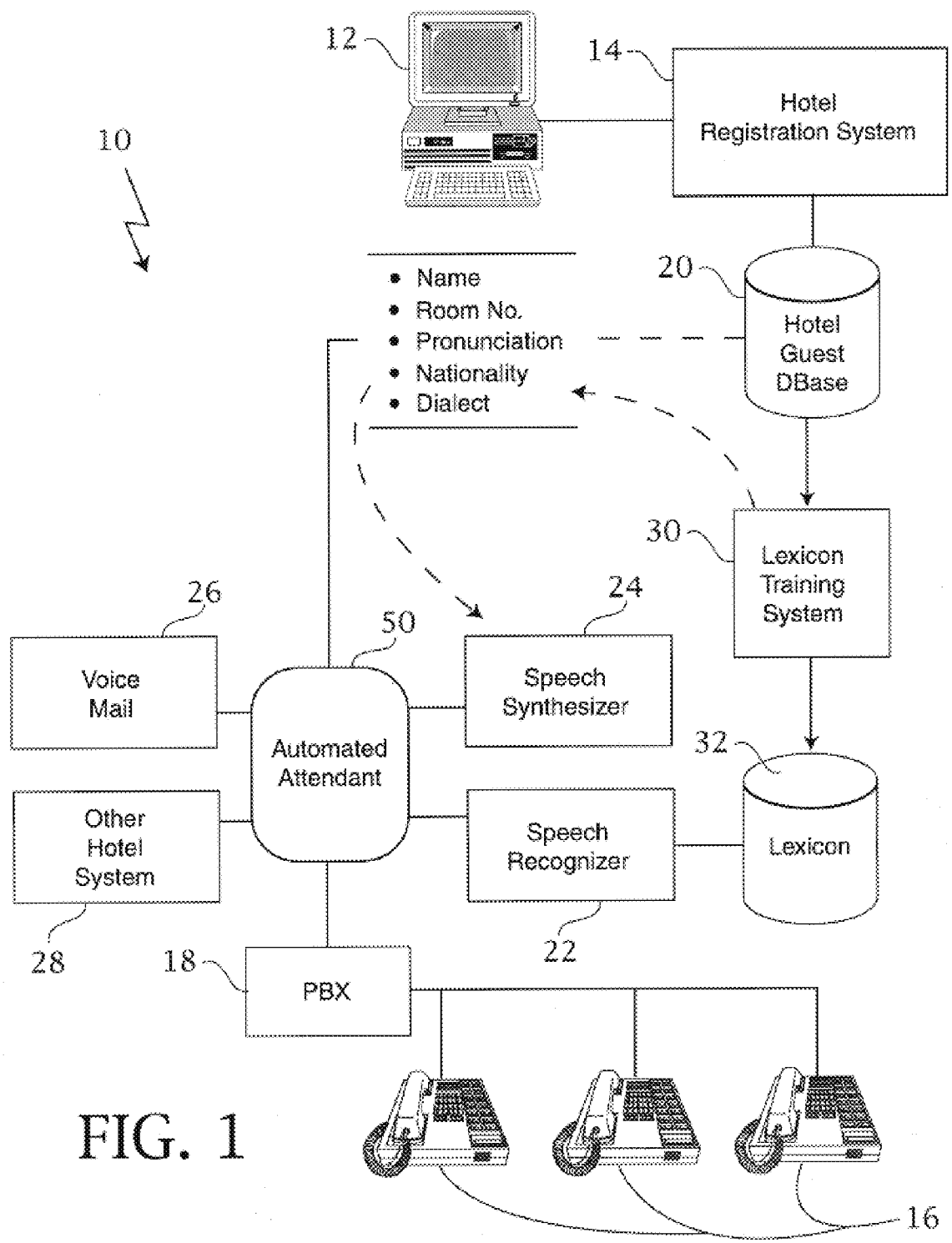
FIG. 1 is a block diagram of a preferred embodiment of an automated hotel attendant system of the present invention.

An automated hotel attendant system 10 is depicted in FIG. 1 for providing hotel guests with additional services by means of speech recognition without the need to be connected to an operator. As a hotel guest checks in, he/she typically provides their name, address, checkout date and other registration information to the hotel attendant. To assist automated hotel attendant system 10, additional information such as the guests nationality or dialect may also be gathered from the hotel guest. This information as well as an assigned hotel guess room number will be captured by a conventional hotel registration system 14 via a computer 12 or other user interface device and stored in a hotel guest database 20.

Once the guest information has been captured, a lexicon training system 30 will automatically transform the written form of a guest's name into one or more phonetic pronunciations of the name. Using the known pronunciation of the guest's name, it is then possible for lexicon training system 30 to build a speaker-independent speech recognition model that is used by a speech recognizer 22. This speech recognition model is stored in a lexicon 32 that is accessed by speech recognizer 22. Each hotel guest's specific phonetic pronunciation can be automatically updated in lexicon 32 every time that guest checks in or check out of the hotel.

Using speech recognition, an automated attendant 50 provides voice dialing by name to another hotel guest room without knowing their room number. A call placed from a hotel telephone 16 via the hotel's telephone switching system (e.g., PBX) 18 is received by automated attendant 50 which in turn will provide the call routing function. A spoken name of a hotel guest is recognized by speech recognizer 22 using the updated lexicon 32. Automated attendant 50 maps the spoken name to their assigned telephone extension by using the hotel guest name to retrieve the telephone extension from hotel guest database 20. Lastly, automated attendant 50 causes telephone switching system 18 to call the retrieved telephone extension, and thereby properly route the requested call. As will be apparent to one skilled in the art, in the event phonetic-based recognition fails, an automated attendant of the present invention can be used in conjunction with a spelled name recognizer or a conventional directory assistance module. As a last resort, the automated attendant should transfer the guests call to a hotel operator. In addition, automated attendant 50 also provides voice dialing to other hotel services and extensions (e.g., front desk room service or hotel restaurant).

For the remainder of the guest's stay in the hotel, the automated attendant system 10 of the present invention can also provide access to other hotel services. For instance, the hotel guest's phonetic pronunciation can be used to customize a message in a voice mail system 26 via a speech synthesizer 24. The customized message is played when the guest is not in their room to receive a call. In addition, the guest's nationality might be used to provide a wake-up call in that nationality's corresponding language. It is also envisioned that the automated attendant of the present invention might also be interfaced with other hotel systems 28.

Figure 2:
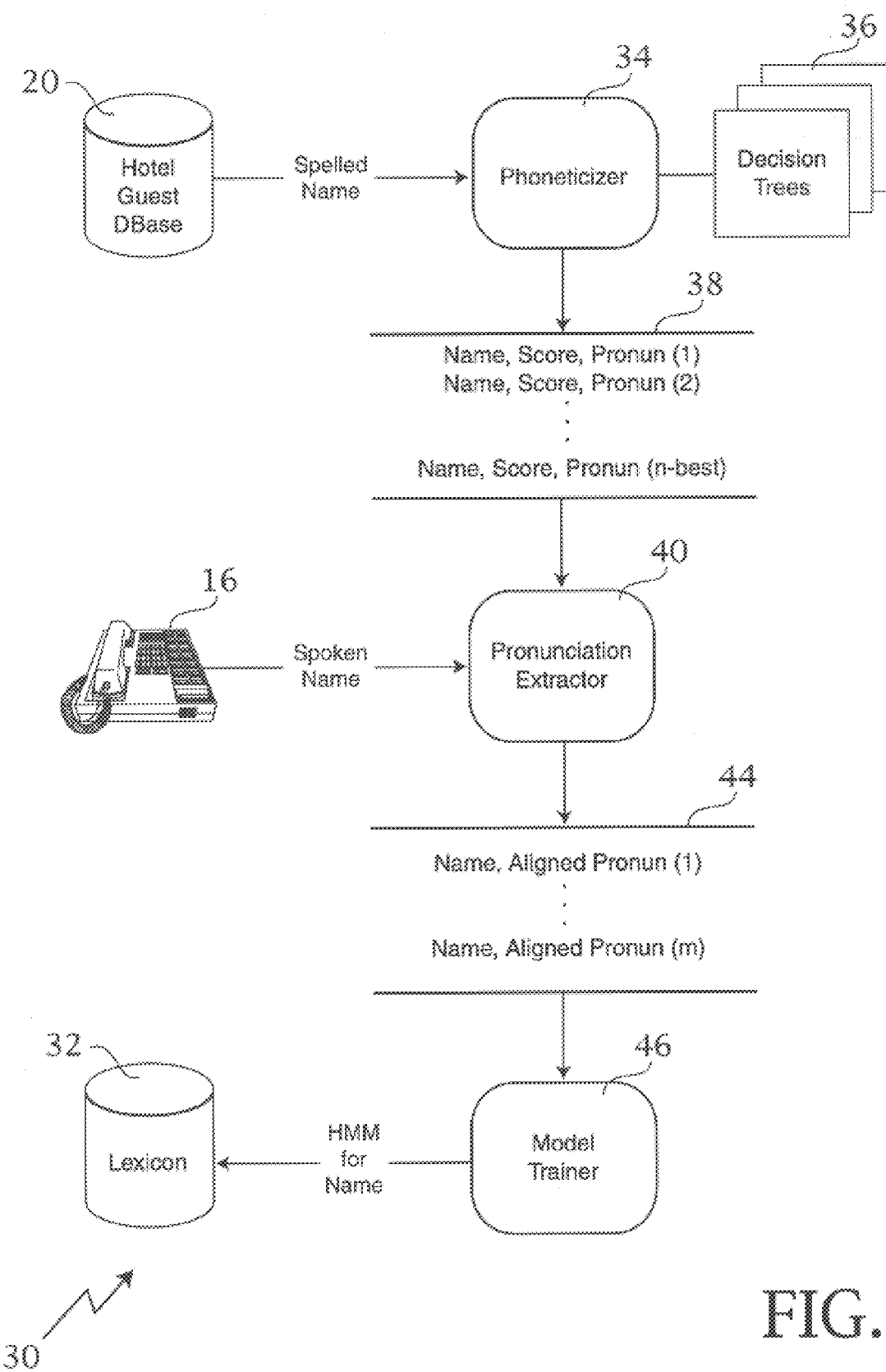
FIG. 2 is a diagram showing the components of a lexicon training system for use in the automated hotel attendant system of the present invention.

Referring to FIG. 2, lexicon training system 30 is shown in greater detail. Generally, lexicon training system generates pronunciations of spelled names by converting the characters that spell those names into word-phoneme data and using these generated pronunciations to train speech recognizer 22. A robust and reliable phoneticizer is imperative to implementing lexicon training system 30. As captured by hotel registration system 14, a spelled form of the guest's name serves as input to phoneticizer 34.

Figure 3:
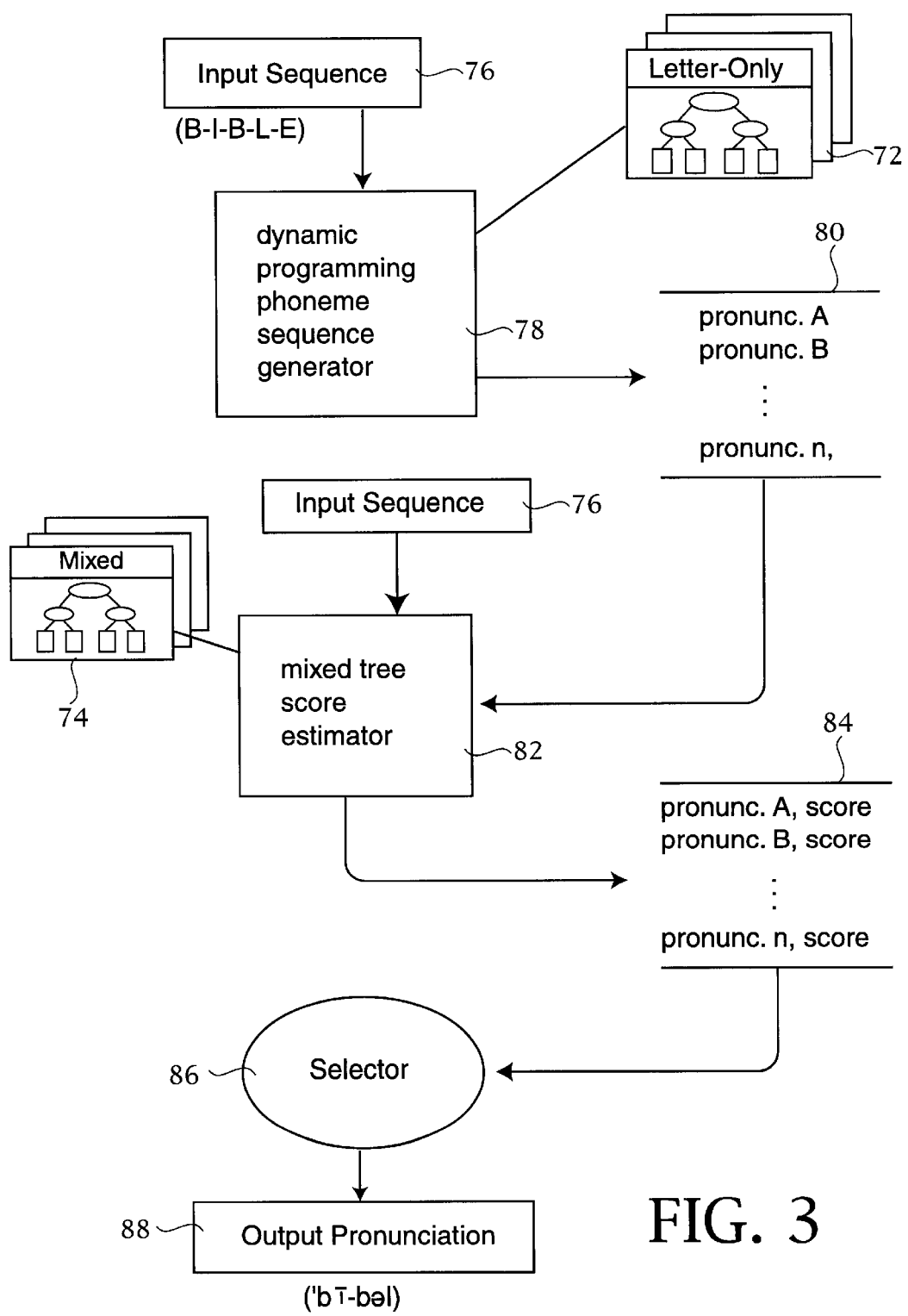
FIG. 3 is a block diagram illustrating the components of a phoneticizer for use in the automated hotel attendant of the present invention.

An exemplary embodiment of phoneticizer 34 is shown in FIG. 3 to illustrate the principles of generating multiple pronunciations based on the spelled form of a hotel guest's name. Heretofore most attempts at spelled word-to-pronunciation transcription have relied solely upon the letters themselves. These techniques leave a great deal to be desired. For example, a letter-only pronunciation generator would have great difficulty properly pronouncing the word Bible. Based on the sequence of letters only the letter-only system would likely pronounce the word "Bib-l", much as a grade school child learning to read might do. The fault in conventional systems lies in the inherent ambiguity imposed by the pronunciation rules of many languages. The English language, for example, has hundreds of different pronunciation rules, making it difficult and computationally expensive to approach the problem on a word-by-word basis.

However, phoneticizer 34 employs two stages, the first stage employing a set of letter-only decision trees 72 and the second stage employing a set of mixed-decision trees 74. An input sequence 76, such as the sequence of letters B-I-B-L-E, is fed to a dynamic programming phoneme sequence generator 78. The sequence generator uses the letter-only trees 72 to generate a list of pronunciations 80, representing possible pronunciation candidates of the spelled word input sequence.

Figure 4:
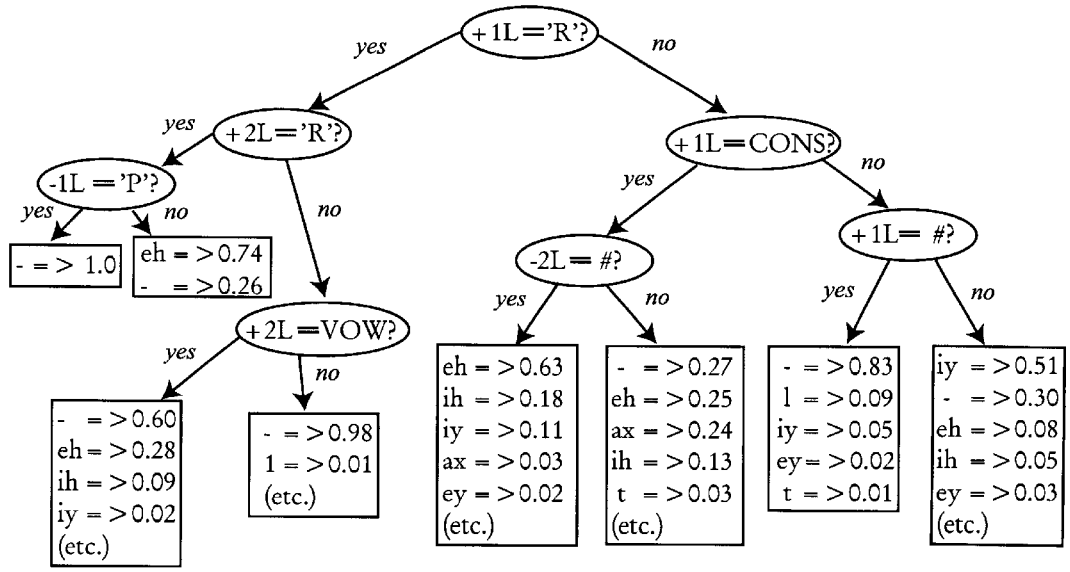
FIG. 4 is a decision tree diagram illustrating a letter-only tree used by the phoneticizer.

The sequence generator sequentially examines each letter in the sequence, applying the decision tree associated with that letter to select a phoneme pronunciation for that letter based on probability data contained in the letter-only tree. Preferably the set of letter-only decision trees includes a decision tree for each letter in the alphabet. FIG. 4 shows an example of a letter-only decision tree for the letter E. The decision tree comprises a plurality of internal nodes (illustrated as ovals in the Figure) and a plurality of leaf nodes (illustrated as rectangles in the Figure). Each internal node is populated with a yes-no question. Yes-no questions are questions that can be answered either yes or no. In the letter-only tree these questions are directed to the given letter (in this case the letter E) and its neighboring letters in the input sequence. Note in FIG. 4 that each internal node branches either left or right depending on whether the answer to the associated question is yes or no.

Abbreviations are used in FIG. 4 as follows: numbers in questions, such as "+1" or "−1" refer to positions in the spelling relative to the current letter. For example, "+1L== 'R'?" means "Is the letter after the current letter (which in this case is the letter E) an R?" The abbreviations CONS and VOW represent classes of letters, namely consonants and vowels. The absence of a neighboring letter, or null letter, is represented by the symbol -, which is used as a filler or placeholder where aligning certain letters with corresponding phoneme pronunciations. The symbol # denotes a word boundary.

The leaf nodes are populated with probability data that associate possible phoneme pronunciations with numeric values representing the probability that the particular phoneme represents the correct pronunciation of the given letter. For example, the notation "iy=>0.51" means "the probability of phoneme 'iy' in this leaf is 0.51." The null phoneme, i.e., silence, is represented by the symbol '-'.

The sequence generator 78 (FIG. 3) thus uses the letter-only decision trees 72 to construct one or more pronunciation hypotheses that are stored in list 80. Preferably each pronunciation has associated with it a numerical score arrived at by combining the probability scores of the individual phonemes selected using the decision tree 72. Word pronunciations may be scored by constructing a matrix of possible combinations and then using dynamic programming to select the n-best candidates. Alternatively, the n-best candidates may be selected using a substitution technique that first identifies the most probably word candidate and then generates additional candidates through iterative substitution, as follows.

The pronunciation with the highest probability score is selected by first multiplying the respective scores of the highest-scoring phonemes (identified by examining the leaf nodes) and then using this selection as the most probable candidate or first-best word candidate. Additional (n-best) candidates are then selected by examining the phoneme data in the leaf nodes again to identify the phoneme, not previously selected, that has the smallest difference from an initially selected phoneme. This minimally-different phoneme is then substituted for the initially selected one to thereby generate the second-best word candidate. The above process may be repeated iteratively until the desired number of n-best candidates have been selected. List 80 may be sorted in descending score order, so that the pronunciation judged the best by the letter-only analysis appears first in the list.

As noted above, a letter-only analysis will frequently produce poor results. This is because the letter-only analysis has no way of determining at each letter what phoneme will be generated by subsequent letters. Thus, a letter-only analysis can generate a high scoring pronunciation that actually would not occur in natural speech. For example, the proper name, Achilles, would likely result in a pronunciation that phoneticizes both ll's: ah-k-ih-l-l-iy-z. In natural speech, the second I is actually silent: ah-k-ih-l-iy-z. The sequence generator using letter-only trees has no mechanism to screen out word pronunciations that would never occur in natural speech.

Figure 5:
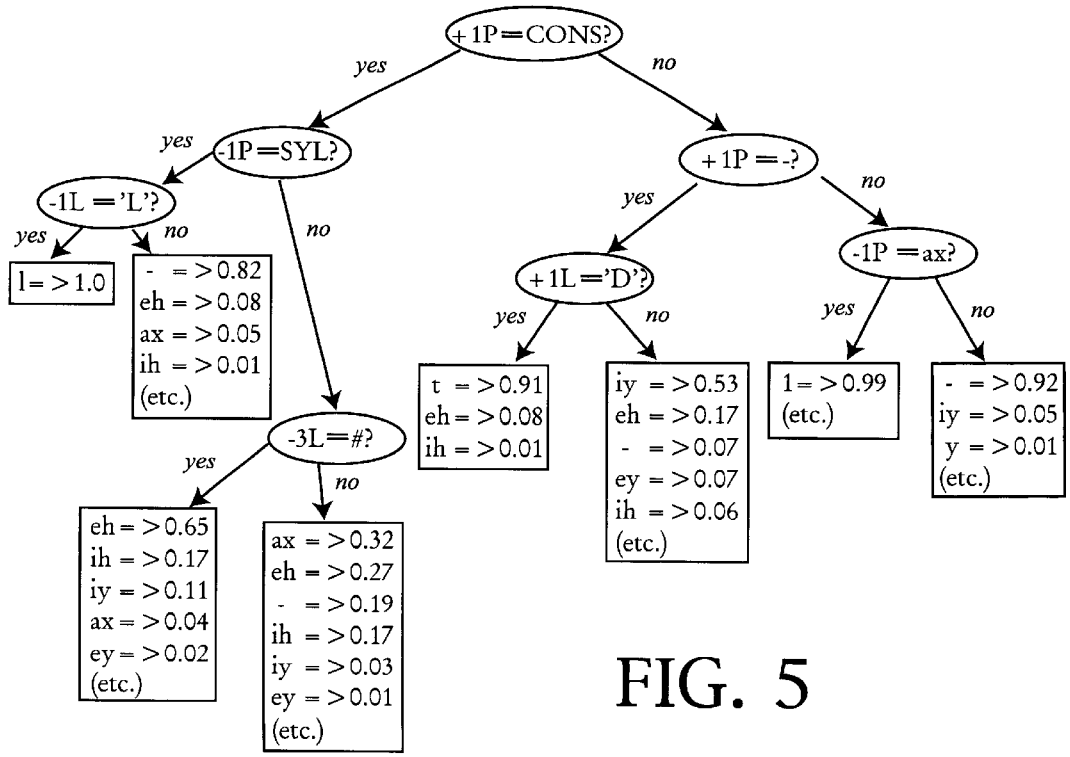
FIG. 5 is a decision tree diagram illustrating a mixed tree used by the phoneticizer.

The second stage of phoneticizer 34 addresses the above problem. A mixed-tree score estimator 82 uses the set of mixed-decision trees 74 to assess the viability of each pronunciation in list 80. The score estimator works by sequentially examining each letter in the input sequence along with the phonemes assigned to each letter by sequence generator 78. Like the set of letter-only trees, the set of mixed trees has a mixed tree for each letter of the alphabet. An exemplary mixed tree is shown in FIG. 5. Like the letter-only tree, the mixed tree has internal nodes and leaf nodes. The internal nodes are illustrated as ovals and the leaf nodes as rectangles in FIG. 5. The internal nodes are each populated with a yes-no question and the leaf nodes are each populated with probability data. Although the tree structure of the mixed tree resembles that of the letter-only tree, there is one important difference. The internal nodes of the mixed tree can contain two different classes of questions. An internal node can contain a question about a given letter and its neighboring letters in the sequence, or it can contain a question about the phoneme associated with that letter and neighboring phonemes corresponding to that sequence. The decision tree is thus mixed, in that it contains mixed classes of questions.

The abbreviations used in FIG. 5 are similar to those used in FIG. 4, with some additional abbreviations. The symbol L represents a question about a letter and its neighboring letters. The symbol P represents a question about a phoneme and its neighboring phonemes. For example, the question "+1L=='D'?" means "Is the letter in the +1 position a 'D'?" The abbreviations CONS and SYL are phoneme classes, namely consonant and syllabic. For example, the question "+1P==CONS?" means "Is the phoneme in the +1 position a consonant?" the numbers in the leaf nodes give phoneme probabilities as they did in the letter-only trees.

The mixed-tree score estimator rescores each of the pronunciations in list 80 based on the mixed-tree questions and using the probability data in the lead nodes of the mixed trees. If desired, the list of pronunciations may be stored in association with the respective score as in list 84. If desired, list 84 can be sorted in descending order so that the first listed pronunciation is the one with the highest score.

In many instances, the pronunciation occupying the highest score position in list 84 will be different from the pronunciation occupying the highest score position in list 80. This occurs because the mixed-tree score estimator, using the mixed trees 74, screens out those pronunciations that do not contain self-consistent phoneme sequences or otherwise represent pronunciations that would not occur in natural speech. As noted above, phoneticizer 34 depicted in FIG. 3 represents only one possible embodiment.

The pronunciations from list 84 can be used to form pronunciation dictionaries for both speech recognition and speech synthesis applications. If desired, a selector module 86 can access list 84 to retrieve one or more of the pronunciations in the list. Typically, selector 86 retrieves the pronunciation with the highest score and provides this as the output pronunciation 88. In the speech recognition context, the pronunciation dictionary is used during the speech recognizer training phase to supply pronunciations for words, such as hotel guest names, that are not already found in a recognizer lexicon.

As applied to lexicon training system 30, n-best pronunciations 38 for each spelled guest name can serve as the input to a model trainer 46 in FIG. 2. In the preferred embodiment of the present invention, Hidden Markov Model (HMM) is used as the basis for model trainer 46. A HMM model associated with each guest name is stored in lexicon 32 for use by speech recognizer 22. Model trainer 46 is a module which builds HMM models by concatenating context dependent phoneme models corresponding to one or more generated pronunciations. Although this embodiment of an automated attendant performs speech recognition at the phoneme level, one skilled in the art will realize that speech recognizer 22 could also be implemented at other recognition levels (i.e., word level).

Lexicon training system 30 can optionally implement a pronunciation extractor 40 which can generate one or several aligned pronunciatons as output 44 that serves as input to model trainer 46. At registration time or some other subsequent time during a guest's stay at the hotel, the spoken name of the hotel guest may be captured via a telephone 16 or other audible receiving device. The spoken name represents the preferred pronunciation of the guests name, and thus should be used by model trainer 46. For example, the spoken name may be converted into a digital form that is in turn used to select one or more pronunciations from among the n-best pronunciations 38 that correspond to the guest's name. To do so, model trainer 46 may build a dynamic grammar using n-best pronunciations 38 and perform recognition on the spoken speech input using the dynamic grammar to select one or more aligned pronunciations 44.

For speech synthesis applications, n-best pronunciations 38 for each guest's name may be used to generate phoneme sounds for concatenated playback. In the context of automated hotel attendant system 10 speech synthesizer 24 may provide a proper pronunciation of a guest's name to a hotel employee (e.g., the receptionist at the front desk) whose is interacting with the guest. It is also envisioned that speech synthesizer 24 may be used to augment the features of an E-mail reader or other text-to-speech applications.

Automated attendant system 10, including an automated attendant module, lexicon training system 30, speech recognizer 22 and speech synthesizer 24, can each be packaged separately or collectively for use with other hotel systems. To facilitate implementation and minimize costs, automated attendant system 10 should be specifically designed to interface with other existing hotel systems, such as the hotel registration system, the hotel billing and accounting system, the hotel telephone switching system, ect. Minimal customization should be needed to implement these types of interfaces. For instance, rather than modifying an existing hotel guest database to incorporate pronunciation, nationality, ect. into an existing data structure, automated attendant system 10 may acquire hotel guest information from either an interface established at the operating system level, via a screen capture at registration time, or from an API defined for hotel registration system 14.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An automated hotel attendant system for coordinating room-to-room calling over a telephone switching system that supports a plurality of telephone extensions, comprising:

a hotel guest database system for receiving and storing characters that spell the names of hotel guests and for assigning each guest an associated telephone extension;

a speech recognition system having a lexicon for storing word-phoneme data that associates a set of words with the phonemes that form those words;

a lexicon training system coupled to said database system for adding hotel guest names and corresponding phoneme data to said lexicon, said training system including a phoneticizer operable to convert the characters that spell a given hotel guests name into a plurality of pronunciations, where the phoneticizer employs letter-only decision trees and phoneme-mixed decision trees to produce said plurality of pronunciations; and a call routing system coupled to said recognition system for converting a spoken name of a hotel guest entered from one of said telephone extensions into a predefined hotel guest name and using said hotel guest name to retrieve an assigned telephone extension from said database system;

said call routing system being interfaced with said telephone switching system to cause said telephone switching system to call said telephone extension in response to the entry of said spoken name from one of said telephone extensions.

2. The automated hotel attendant system of claim 1 wherein said lexicon training system further comprises:

a model trainer coupled to said phoneticizer for building an Hidden Markov Model (HMM) for each of said hotel guest names from said corresponding plurality of pronunciations and for storing said HMM in said lexicon for use by said speech recognition system.

3. The automated hotel attendant system of claim 2 further comprising a pronunciation extractor coupled between said phoneticizer and said model trainer for generating at least one aligned pronunciations to serve as input to said model trainer, said pronunciation extractor receiving a spoken pronunciation of a hotel guest's name and being operable to select at least one of said plurality of pronunciations from said phoneticizer based on the spoken pronunciation of said hotel guest's name.

4. The automated hotel attendant system of claim 1 wherein said hotel guest database system stores characters that spell the name of a first hotel service that is assigned a first telephone extension such that said automated hotel attendant system provides call routing to said first telephone extension in response to the entry of a spoken name of said first hotel service from one of said telephone extensions.

5. The automated hotel attendant system of claim 1 further comprising a spelled name recognizer coupled to said call routing system and said telephone switching system for coordinating room-to-room calling when said speech recognizer fails to recognize said spoken name of the hotel guest.

6. An automated attendant system for coordinating extension-to-extension calling over a telephone switching system that supports a plurality of telephone extensions, comprising:

a telephone database system for receiving and storing characters that spell an identifier for a telephone system user and for assigning each telephone system user an associated telephone extension;

a speech recognition system having a lexicon for storing word-phoneme data that associates a set of words with the phonemes that form those words;

a lexicon training system coupled to said telephone database system for adding said identifiers and corresponding phoneme data to said lexicon, said training system including a phoneticizer operable to convert the characters that spell a given identifier into a plurality of pronunciatons, where the phoneticizer employs letter-only decision trees and phoneme-mixed decision trees to produce said plurality of pronunciations, the letter-only decision trees having nodes representing questions about a given letter and neighboring letters in the given identifier and the phoneme-mixed decision trees having nodes representing questions about a phoneme and neighboring phonemes in the given identifier; and a call routing system coupled to said recognition system for converting a spoken identifier of a system user entered from one of said telephone extensions into a predefined system user identifier and using said system user identifier to retrieve an assigned telephone extension from said telephone database system;

said call routing system being interfaced with said telephone switching system to cause said telephone switching system to call said telephone extension in response to the entry of said spoken identifier from one of said telephone extensions.

7. The automated attendant system of claim 6 wherein said lexicon training system further comprises:

a model trainer coupled to said phoneticizer for building an Hidden Markov Model (HMM) for each of said identifiers from said corresponding plurality of pronunciations and for storing said HMM in said lexicon for use by said speech recognition system.

8. The automated attendant system of claim 7 further comprising a pronunciation extractor coupled between said phoneticizer and said model trainer for generating at least one aligned pronunciations to serve as input to said model trainer, said pronunciation extractor receiving a spoken identifier of a system user and being operable to select at least one of said plurality of pronunciations from said phoneticizer based on the spoken pronunciation of said identifier.

9. The automated attendant system of claim 6 wherein said identifier is further defined as at least one of a name and a location associated with the assigned telephone extension.

10. The automated attendant system of claim 6 further comprising a spelled name recognizer coupled to said call routing system and said telephone switching system for coordinating room-to-room calling when said speech recognizer fails to recognize said spoken identifier of the system user.

11. An automated attendant system for providing a synthesized pronunciation of a hotel guests name over a telephone switching system that supports a plurality of telephone extensions, comprising:

a hotel guest database system for receiving and storing characters that spell the names of hotel guests and for storing information associated with each guest;

a speech synthesizer system having a lexicon for storing word-phoneme data that associates a set of words with the phonemes that form those words;

a lexicon training system coupled to said database system for adding hotel guest names and corresponding phoneme data to said lexicon, said training system including a phoneticizer operable to convert the characters that spell a given hotel guest name into a plurality of pronunciations, where the phoneticizer employs letter-only decision trees and phoneme-mixed decision trees to produce said plurality of pronunciations, the letter only decision trees having nodes representing questions about a given letter and neighboring letters in the given hotel guest name and the phoneme-mixed decision trees having nodes representing questions about a phoneme and neighboring phonemes in the given hotel guest name; and a virtual attendant coupled to said hotel guest database system and said speech synthesizer system for converting a spelled name of a hotel guest entered by a system user of said hotel guest database system into a synthesized pronunciation of said spelled name using the word-phoneme data;

said virtual attendant being interfaced with said telephone switching system to provide said synthesized pronunciation to said system user over one of said telephone extensions.

12. The automated attendant system of claim 1 wherein the letter-only decision trees include nodes representing questions about a given letter and neighboring letters in the given hotel guest name and the phoneme-mixed decision trees include nodes representing questions about a phoneme and neighboring phonemes in the given hotel guest name.

* * * * *